(12) United States Patent
Luo et al.

(10) Patent No.: US 12,085,182 B2
(45) Date of Patent: Sep. 10, 2024

(54) PRESSURE REGULATING VALVE ASSEMBLY FOR PNEUMATIC SPRAY GUN

(71) Applicants: Qin Luo, Zhejiang (CN); Hai Wu, Zhejiang (CN); Fazheng Yang, Zhejiang (CN); Xiaorong Li, Zhejiang (CN)

(72) Inventors: Qin Luo, Zhejiang (CN); Hai Wu, Zhejiang (CN); Fazheng Yang, Zhejiang (CN); Xiaorong Li, Zhejiang (CN)

(73) Assignee: Zhejiang Rongpeng Air Tools Co., Ltd., Zhejiang (CN)

( * ) Notice: Subject to any disclaimer, the term of this patent is extended or adjusted under 35 U.S.C. 154(b) by 83 days.

(21) Appl. No.: 17/823,962

(22) Filed: Sep. 1, 2022

(65) Prior Publication Data

US 2024/0003449 A1 Jan. 4, 2024

(30) Foreign Application Priority Data

Jun. 29, 2022 (CN) .......................... 202221642330.7

(51) Int. Cl.
| | | |
|---|---|---|
| *F16K 17/06* | (2006.01) | |
| *B05B 7/24* | (2006.01) | |
| *F16K 1/04* | (2006.01) | |

(52) U.S. Cl.
CPC ............ *F16K 17/06* (2013.01); *B05B 7/2478* (2013.01); *F16K 1/04* (2013.01)

(58) Field of Classification Search
CPC ......... B05B 7/1209; B05B 7/129; F16K 1/04; F16K 1/38; F16K 1/48–487

USPC ........ 239/413, 581.1, 581.2, 582.1; 251/121, 251/122, 215, 218, 265, 318, 339
See application file for complete search history.

(56) References Cited

U.S. PATENT DOCUMENTS

| | | | | |
|---|---|---|---|---|
| 4,532,954 A | * | 8/1985 | Fillman | E03B 9/025 138/46 |
| 5,191,797 A | * | 3/1993 | Smith | G01L 19/083 73/756 |
| 7,216,813 B2 | * | 5/2007 | Rogers | B05B 7/2402 73/756 |
| 8,678,348 B1 | * | 3/2014 | Cassel | F16K 37/0016 251/223 |
| 2001/0035507 A1 | * | 11/2001 | Tokuda | F16K 1/482 251/63.5 |
| 2012/0292411 A1 | * | 11/2012 | Zhu | B05B 12/0022 239/526 |

(Continued)

*Primary Examiner* — Robert K Arundale

(57) ABSTRACT

An pressure regulating valve assembly for a pneumatic spray gun is disclosed. The pressure regulating vale component is configured inside the pressure regulating passage of the gun body, comprising a pressure regulating screw seat, a pressure regulating rod going through the pressure regulating screw seat and in threaded connection with the pressure regulating screw seat. A pressure regulating seal ring is configured between the pressure regulating rod and the pressure regulating screw seat. A clamping check ring is configured in the middle portion of the pressure regulating rod. The clamping check ring is used to limit the position of the pressure regulating rod. The inner end of the pressure regulating rod is provided with a pressure regulating valve. The position of the pressure regulating valve is limited by the split damping ring configured on the end portion of the pressure regulating rod.

3 Claims, 4 Drawing Sheets

(56) References Cited

U.S. PATENT DOCUMENTS

| | | | |
|---|---|---|---|
| 2015/0260600 A1* | 9/2015 | Hata | B05B 12/008 |
| | | | 73/756 |
| 2017/0348710 A1* | 12/2017 | Kaneko | B05B 7/068 |
| 2019/0001359 A1* | 1/2019 | Negri | B05B 12/008 |
| 2019/0022606 A1* | 1/2019 | Dubiel | B01F 25/31243 |
| 2021/0162438 A1* | 6/2021 | Zaki | B05B 7/1209 |
| 2024/0001389 A1* | 1/2024 | Zhou | B05B 12/002 |

* cited by examiner

PRESSURE REGULATING VALVE ASSEMBLY FOR PNEUMATIC SPRAY GUN

BACKGROUND OF INVENTION

1. Field of the Invention

The present invention relates to a pressure regulating valve assembly for a pneumatic spray gun.

2. Description of Related Art

A pneumatic spray gun is a spraying device powered by compressed air. Compressed air is supplied from the air inlet tube into the gun body. When the high-pressure compressed air is ejected from the air cap on the front portion of the spray gun, a zone of negative pressure lower than the atmosphere pressure is created in front of the paint nozzle. Due to the pressure difference in front of the muzzle, the paint is sucked out from the paint storage tank and is atomized into tiny particles by the high-speed ejected compressed air, thus being coated on the surface to be painted. The technology of the pneumatic spray gun is already quite mature. However, manufacturers are still making effort in further improvements in terms of optimized structure, better performance, longer life cycle, lower production cost, simplified assembly etc., with a view to maintaining their competitive edge in the market.

In the conventional pneumatic spray gun, the pressure regulating rod and the pressure regulating valve on the end of the pressure regulating rod are formed integrally by plastic injection. During the pressure modulation, the pressure regulating valve is subject to wearing due to the friction with the inner wall of the gun body. Over time, it will become necessary to replace the pressure regulating valve. Due to the integral formation, the pressure regulating rod must also be replaced. On the other hand, pressure regulating seal ring on the pressure regulating rod must also be replaced. This causes a high maintenance cost and a long time to wait during the maintenance.

SUMMARY OF THE INVENTION

In view of the shortcomings of the above problems, the present invention provides an assembled and formed pneumatic spray gun pressure regulating valve assembly.

In order to achieve the above purpose, the present invention provides a pressure regulating valve assembly for a pneumatic spray gun, wherein the pressure regulating valve assembly is disposed in a pressure regulating passage of a gun body, and comprises a pressure regulating screw seat fixedly connected with the gun body, a pressure regulating rod inserted into the pressure regulating screw seat and screwed to the pressure regulating screw seat through a thread, a pressure regulating seal ring disposed between the pressure regulating rod and the pressure regulating screw seat, a clamping check ring disposed in a middle portion of the pressure regulating rod and used to limit the position of the pressure regulating rod, and a pressure regulating valve disposed in an inner end of the pressure regulating rod and being limited by a split damping configured on an end portion of the pressure regulating rod.

More particularly, wherein the pressure regulating rod is fitted with a pressure regulating washer, the pressure regulating washer being located below the pressure regulating valve.

More particularly, wherein the outer end of the pressure regulating rod is fixed with a pressure regulating cap through a screw, the pressure regulating screw seat has a shoulder to interact with the pressure regulating cap, said shoulder being used to limit the position of the pressure regulating rod.

More particularly, wherein the pressure regulating screw seat is in threaded connection with the gun body and is sealed up, the lower end of the pressure regulating screw seat is formed with a hex head, the hex head is hidden inside the pressure regulating cap.

Comparing to the prior art, the present invention has the following benefits: as the existing air inlet pressure regulating valve is integrally formed through plastic injection, the replacement cost is quite high, whereas in the present invention, the pressure regulating valve assembly is independently made as a spare part and can be easily assembled. When maintenance is required, only the pressure regulating valve needs to be replaced. This can save the time and cost of maintenance. The existing pressure regulating screw seat usually has a hex head configured in the middle, whereas in the present invention, the hex head is configured below the pressure regulating screw seat and is covered by the pressure regulating cap for better appearance.

DETAILED DESCRIPTION OF THE INVENTION

Figure 1:
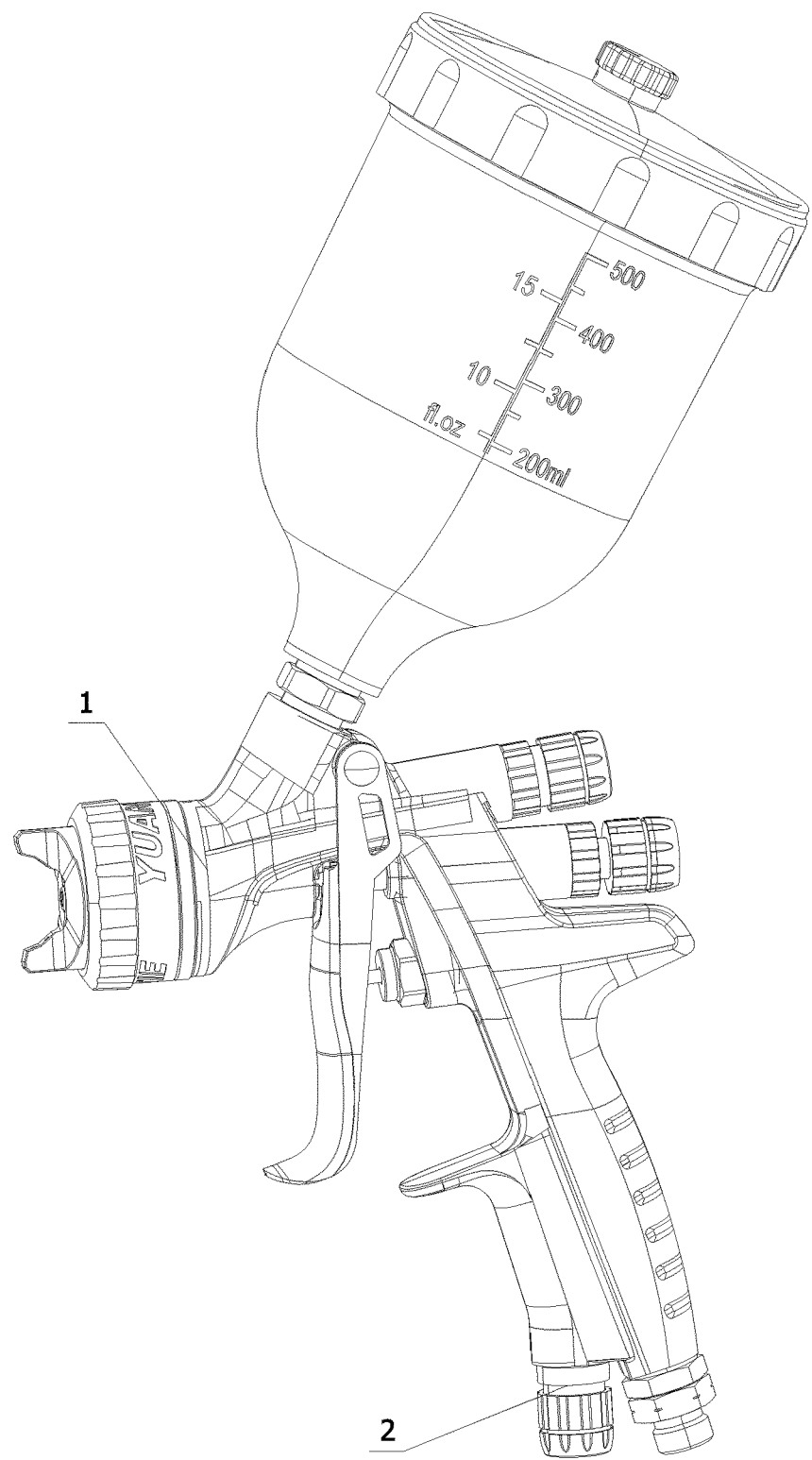
FIG. 1 is a perspective view of a pneumatic spray gun configured with a pressure regulating valve assembly according to the present invention.
Figure 2:
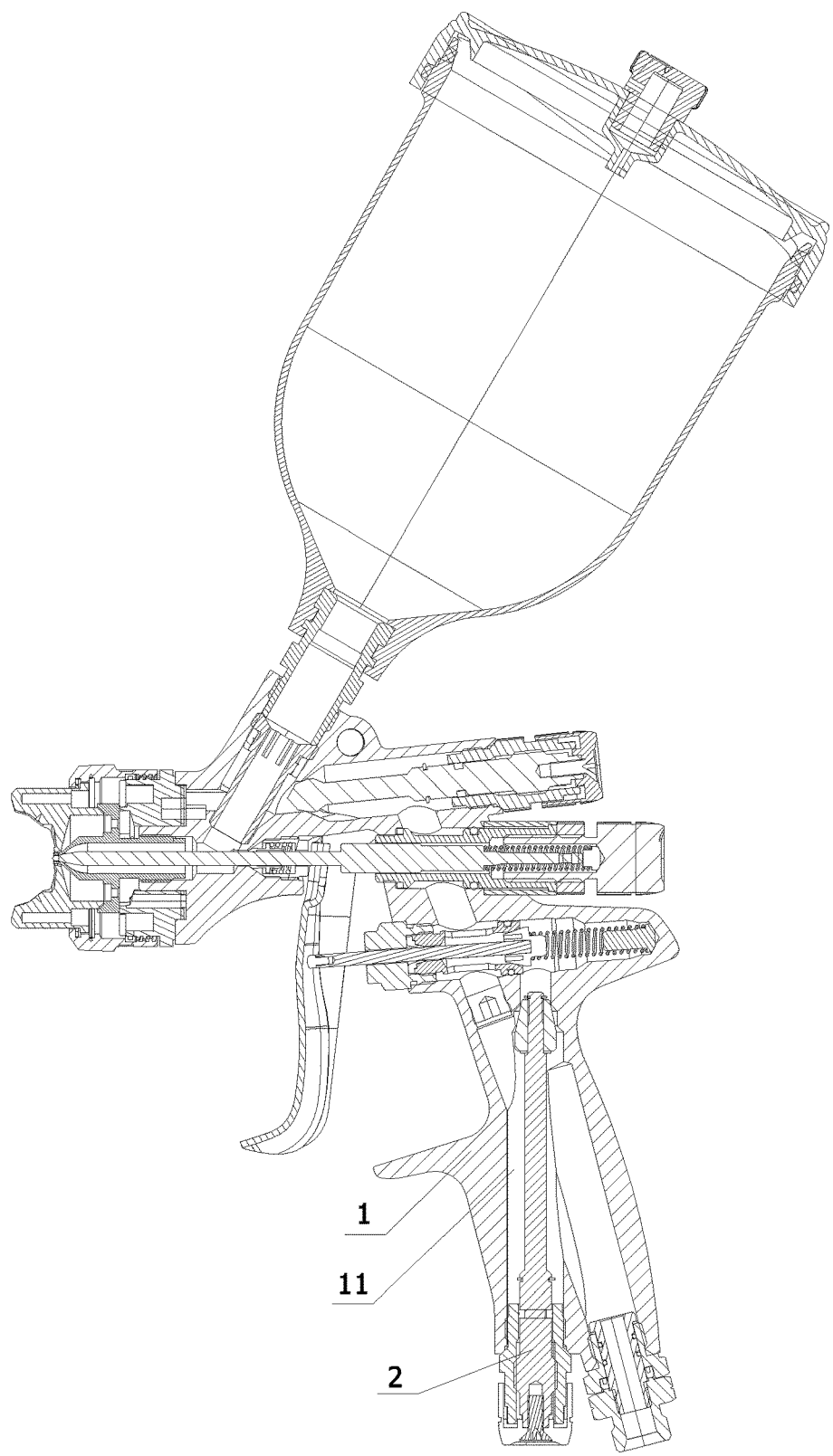
FIG. 2 is a sectional view of FIG.
Figure 3:
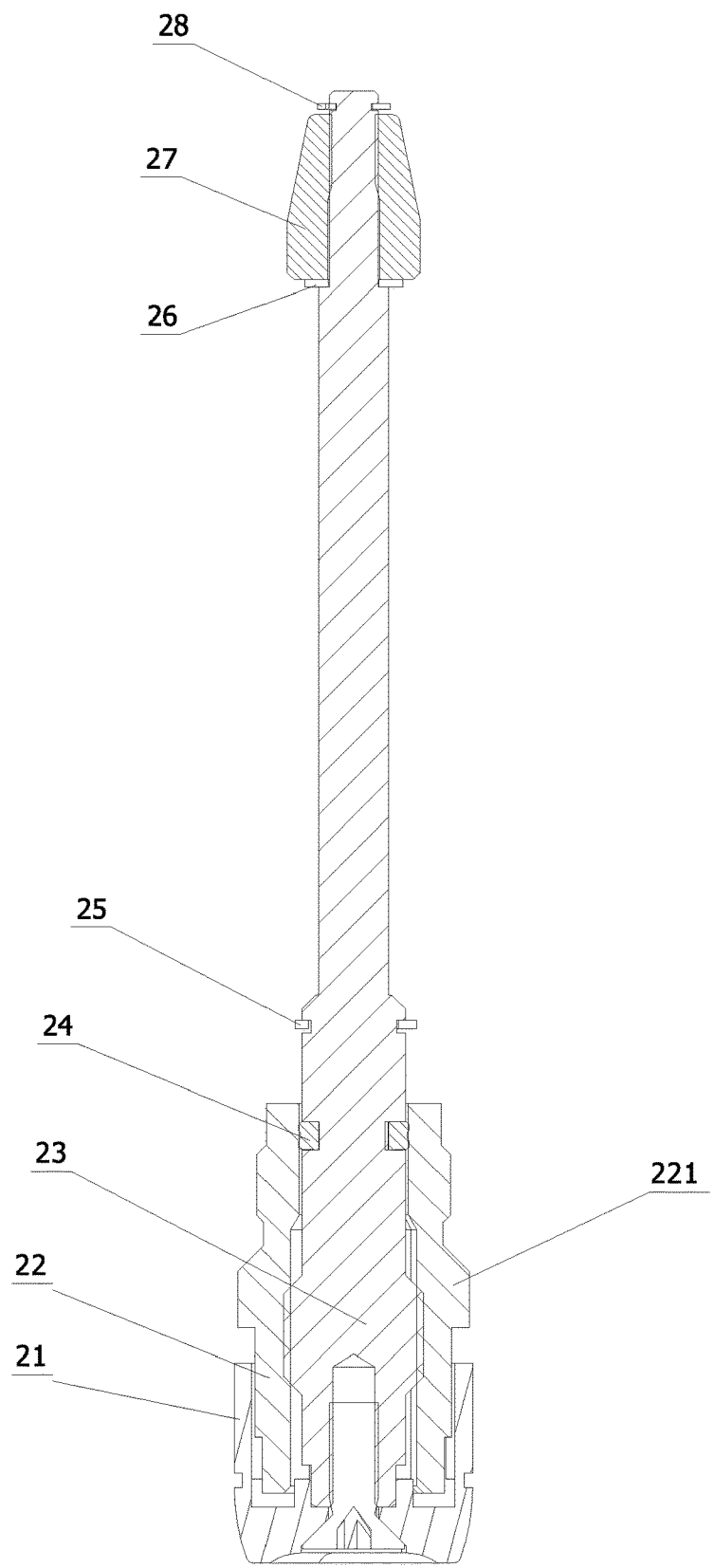
FIG. 3 is a diagrammatic view of a pressure regulating valve assembly according to the present invention.
Figure 4:
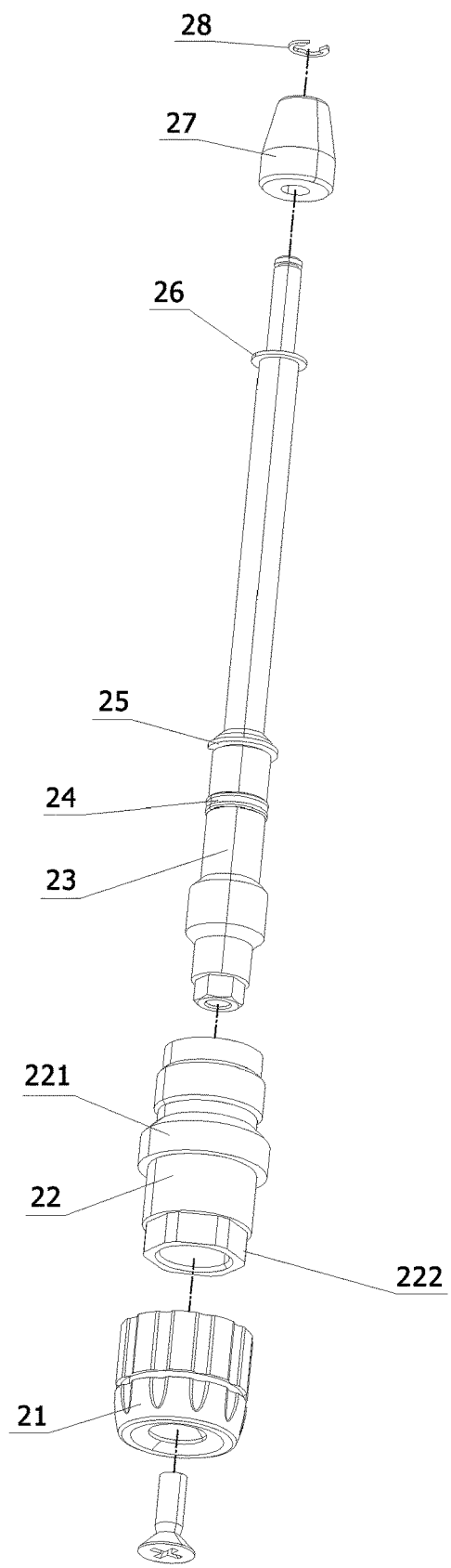
FIG. 4 is an exploded view of a pressure regulating valve assembly according to the present invention.

Disclosed in FIGS. 1-4 is a pressure regulating valve assembly for a pneumatic spray gun. The pressure regulating valve assembly 2 is configured inside the pressure regulating passage 11 of the gun body 1, comprising a pressure regulating screw seat 22 that is fixed with the gun body 1, a pressure regulating rod 23 going through the pressure regulating screw seat 22 and in threaded connection with the pressure regulating screw seat 22. A pressure regulating seal ring 24 is configured between the pressure regulating rod 23 and the pressure regulating, screw seat 22. The middle portion of the pressure regulating rod 23 is configured with a clamping check ring 25. The clamping check ring 25 is used to limit the position of the pressure regulating rod 23. The inner end of the pressure regulating rod 23 is configured with a pressure regulating valve 27. The position of the pressure regulating valve 27 is limited by the split damping ring 28 configured on the end portion of the pressure regulating rod 23. The pressure regulating rod 23 is fitted with a pressure regulating washer 26. The pressure regulating washer 26 is located below the pressure regulating valve 27. The pressure regulating washer can increase the supporting area below the pressure regulating valve. Meanwhile, it can facilitate disassembly and replacement when the pressure regulating valve is worn out. The outer end of the pressure regulating rod 23 is fixed with a pressure regulating cap 21 through a screw. The pressure regulating screw seat 22 has a shoulder 221 to interact with the pressure regulating cap 21. The shoulder 221 is used to limit the position of the pressure regulating rod 23. Through the pressure regulating cap, the pressure regulating rod can be rotated easily. Meanwhile, the pressure regulating cap also offers a positioning function when working with the shoulder. The pressure regulating screw seat 22 is in threaded connection with the gun body 1 and is sealed up. The lower end of the pressure regulating screw seat 22 is formed with a hex head 222. The hex head 222 is hidden inside the pressure regulating cap 21. Through the hex head, the pressure regulating screw seat can be easily connected with the gun body. The design of the hidden hex head can enhance the overall appearance of the pressure regulating valve assembly.

The conventional air inlet pressure regulating valve is made through integral plastic injection. Replacement is very costly. In the present invention, the pressure regulating valve assembly 2 is an assembly of independently processed spare parts. The pressure regulating valve 27 can be replaced independently to save the cost and time of maintenance. The conventional pressure regulating screw seat usually has a hex head configured in the middle portion, whereas in the present invention, the hex head 222 is configured below the pressure regulating screw seat and is hidden by the pressure regulating cap 21 to enhance the overall appearance of the product.

The usage of the present invention is detailed as below:

Through the pressure regulating cap 21, the pressure regulating rod 23 can be driven to rotate simultaneously with the pressure regulating screw seat 22. The pressure regulating rod 23 will have displacement in the axial direction, so that the pressure regulating valve 27 will move close to or away from the position of the upper port of the pressure regulating passage 11 to adjust the opening and the volume of air inlet, thus realizing the modulation of pressure.

To replace the pressure regulating valve 27, disassemble the whole pressure regulating valve assembly (firstly remove the pressure regulating cap 21, and detach the pressure regulating screw seat 22 as well as other assembly through the hex head 222), and take off the split damping ring 28. Install a new pressure regulating valve 27 and put the split damping ring back to its position. Then reinstall the whole pressure regulating valve assembly back into the pressure regulating passage 11. The whole operation is easy and quick.

We claim:

1. A pressure regulating valve assembly for a pneumatic spray gun, wherein the pressure regulating valve assembly (2) is disposed in a pressure regulating passage (11) of a gun body (1), and comprises
    a pressure regulating screw seat (22) being threaded to the gun body (1),
    a pressure regulating rod (23) inserted into the pressure regulating screw seat (22) and screwed to the pressure regulating screw seat (22) through a thread,
    a pressure regulating seal ring (24) disposed between the pressure regulating rod (23) and the pressure regulating screw seat (22),
    a clamping check ring (25) disposed in a middle portion of the pressure regulating rod (23) and used to limit the position of the pressure regulating rod (23), and
    a pressure regulating valve (27) disposed in an inner end of the pressure regulating rod (23) and being limited by a split damping ring (28) configured on an end portion of the pressure regulating rod (23);
    wherein the pressure regulating rod (23) is fitted with a pressure regulating washer (26), the pressure regulating washer (26) being located below the pressure regulating valve (27).

2. The pressure regulating valve assembly for the pneumatic spray gun defined in claim 1, wherein the outer end of the pressure regulating rod (23) is fixed with a pressure regulating cap (21) through a screw, the pressure regulating screw seat (22) has a shoulder (221) to interact with the pressure regulating cap (21), the shoulder (221) being used to limit the position of the pressure regulating rod (23).

3. The pressure regulating valve assembly for the pneumatic spray gun defined in claim 2, wherein the pressure regulating screw seat (22) is in threaded connection with the gun body (1) and is sealed up, the lower end of the pressure regulating screw seat (22) is formed with a hex head (222), the hex head (222) is hidden inside the pressure regulating cap (21).

* * * * *